(12) United States Patent
Miyoshi

(10) Patent No.: US 11,981,302 B2
(45) Date of Patent: May 14, 2024

(54) BRAKE HYDRAULIC PRESSURE CONTROL APPARATUS AND MANUFACTURING METHOD OF SAME

(71) Applicant: Robert Bosch GmbH, Stuttgart (DE)

(72) Inventor: Shogo Miyoshi, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/257,682

(22) PCT Filed: Dec. 2, 2021

(86) PCT No.: PCT/IB2021/061209
§ 371 (c)(1),
(2) Date: Jun. 15, 2023

(87) PCT Pub. No.: WO2022/136984
PCT Pub. Date: Jun. 30, 2022

(65) Prior Publication Data
US 2024/0025387 A1    Jan. 25, 2024

(30) Foreign Application Priority Data
Dec. 21, 2020   (JP) ................. 2020-211841

(51) Int. Cl.
*B60T 11/18* (2006.01)
*B23P 19/02* (2006.01)
(Continued)

(52) U.S. Cl.
CPC ............. *B60T 11/18* (2013.01); *B23P 19/02* (2013.01); *B60T 11/165* (2013.01); *F15B 15/1471* (2013.01)

(58) Field of Classification Search
CPC ...... F15B 7/08; F15B 15/1471; B60T 11/165; B60T 11/18
See application file for complete search history.

(56) References Cited

U.S. PATENT DOCUMENTS 5,161,376 A * 11/1992 Hartmann ............. B60T 11/232
60/588
6,434,931 B1 * 8/2002 Shaw ..................... B60T 11/232
91/422
(Continued)

FOREIGN PATENT DOCUMENTS

DE    102005033423 A1    1/2007
DE    102009021348 A1    12/2009
(Continued)

OTHER PUBLICATIONS

International Search Report and Written Opinion for Application No. PCT/IB2021/061209 dated Mar. 14, 2022 (10 pages).

*Primary Examiner* — Thomas E Lazo
(74) *Attorney, Agent, or Firm* — Michael Best & Friedrich LLP

(57) ABSTRACT

To prevent occurrence of contamination at the time of press-inserting and fixing a guide ring that guides sliding of a piston.
In a brake hydraulic pressure control apparatus (1) including: a base body (2) having a cylinder hole (3); a piston (5) fitted to the cylinder hole (3) in a freely slidable manner; and a guide ring (8) attached to an opening (9) of the cylinder hole (3) and guiding sliding of the piston (5), the guide ring (8) has: a flange portion (8e) in a lower surface (8b) opposing the cylinder hole (3), the flange portion (8e) expanding in a radial direction of the guide ring (8); and bulged portions (8c) arranged at equally-spaced intervals to an outer circumferential surface (8d) of the guide ring (8) and each bulged outward in the radial direction of the guide ring (8) when compared to the flange portion (8e). When seen from a cross section in an axial direction (Ax) of the guide ring (8), each of the bulged portions (8c) has a tapered (Continued)

portion (8f) expanding in the radial direction of the guide ring (8) from the lower surface (8b) toward an upper surface (8a) of the guide ring (8).

6 Claims, 4 Drawing Sheets

(51) Int. Cl.
*B60T 11/16* (2006.01)
*F15B 15/14* (2006.01)

(56) References Cited

U.S. PATENT DOCUMENTS

| | | | |
|---|---|---|---|
| 7,219,495 B2 * | 5/2007 | Ludsteck | F16D 25/088 |
| | | | 92/165 PR |
| 9,341,265 B2 * | 5/2016 | Bernadat | B60T 11/18 |
| 11,136,014 B2 * | 10/2021 | Szymanski | B60T 11/26 |

FOREIGN PATENT DOCUMENTS

| | | | |
|---|---|---|---|
| DE | 102016218422 A1 | | 3/2018 |
| DE | 102017206289 A1 * | | 10/2018 |
| JP | S6067253 A | | 4/1985 |
| JP | 2016023653 A | | 2/2016 |
| JP | 2020528385 A | | 9/2020 |

* cited by examiner

[FIG. 1]
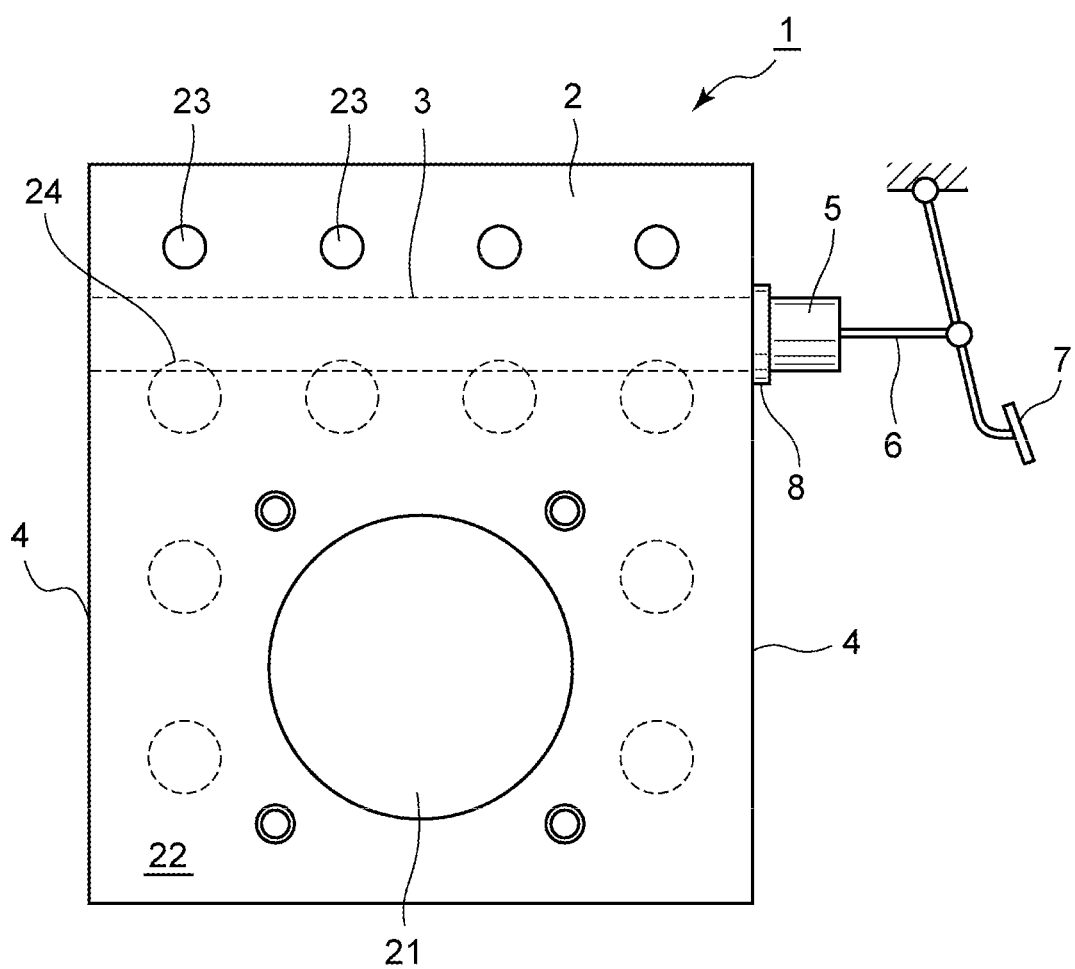

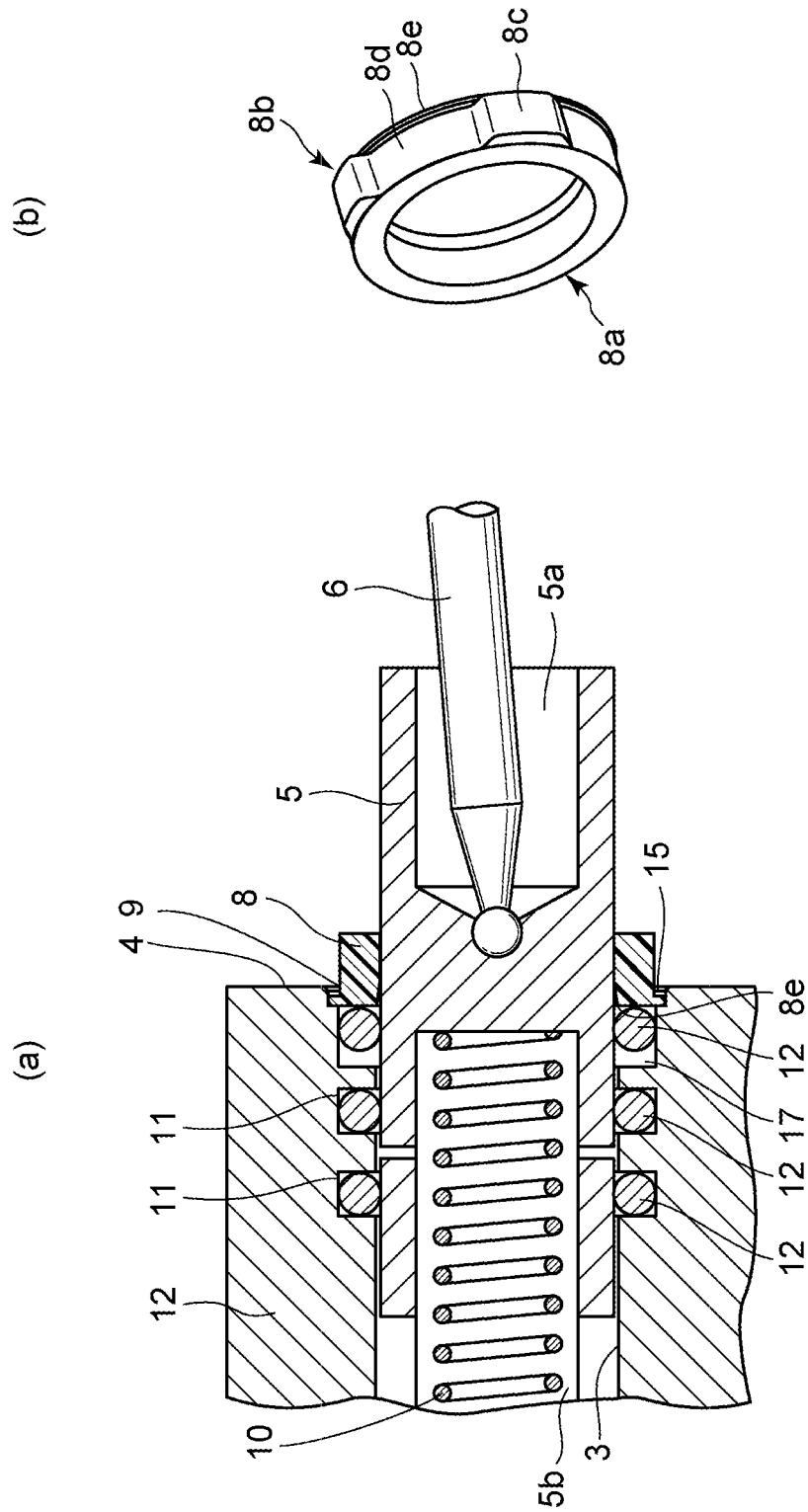
[FIG. 2]

[FIG. 3]
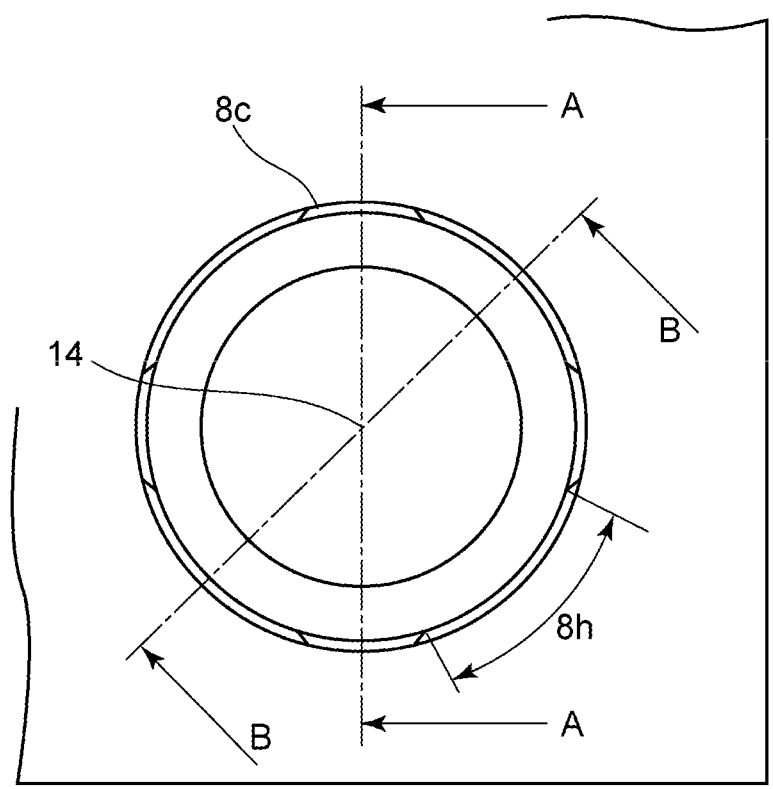

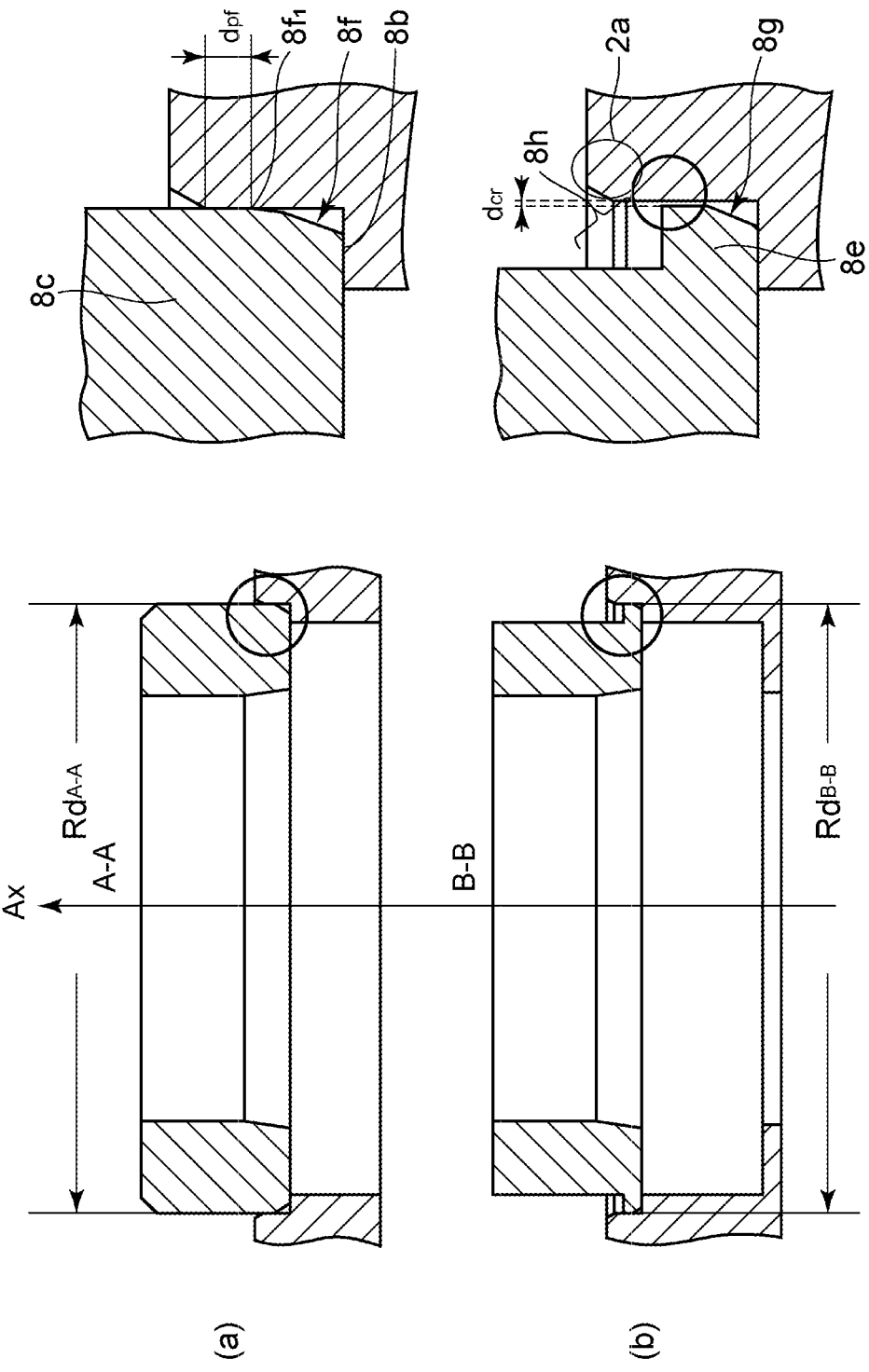
[FIG. 4]

BRAKE HYDRAULIC PRESSURE CONTROL APPARATUS AND MANUFACTURING METHOD OF SAME

BACKGROUND

The present invention relates to a brake hydraulic pressure control apparatus and, in particular, to a hydraulic pressure control apparatus including a cylinder hole that slidably accommodates a piston.

Conventionally, as a brake hydraulic pressure control apparatus, a brake hydraulic pressure control apparatus that has a master cylinder function integrated into a vehicle stabilization controller, to which an electromagnetic valve controlling a flow of a brake fluid and the like are attached, has been known. A base body of such a brake hydraulic pressure control apparatus is provided with a cylinder hole for accommodating a piston that slides according to input of a brake pedal by a driver.

SUMMARY

An opening of the cylinder hole is provided with a guide member for guiding sliding of the piston. There is a case where the guide member is integrally formed with the base body, and there is a case where the guide member is separately formed from the base body and the guide member is thereafter attached to the opening of the cylinder hole.

However, in the case where the guide member is integrally formed with the base body, the guide member is formed such that a part thereof is projected from the rectangular-parallelepiped base body. Thus, a facility for processing the guide member is separately required, which increases processing cost. For this reason, a method for creating the guide member in a separate step and thereafter attaching the guide member to the opening is frequently adopted.

Such a method is available that, in order to attach the guide member to the base body, the guide member is first press-fitted to the opening of the cylinder hole and is thus temporarily fixed thereto and the guide member is then caulked to the base body by plastically deforming the base body.

In order to accurately guide the piston by an inner diameter portion of the guide member and the cylinder hole, accurate coaxiality is requested. However, in the case where a fastening allowance between an outer diameter portion of the guide member and an inner diameter portion of the cylinder hole becomes larger than a predetermined value, sliding resistance against the cylinder hole is increased during press-fitting. As a result, such a problem occurs that surface treatment of the guide member is peeled or that the inner diameter portion of the guide member is deformed.

In order to prevent the above, a strict dimensional tolerance is requested for each of the outer diameter portion of the guide member and the inner diameter portion of the cylinder hole. However, as the dimensional tolerance becomes stricter, processing cost for the guide member is increased.

The present invention has been made in view of the above-described problem as the background and therefore has a purpose of improving a problem that occurs when the guide member is press-fitted to a cylinder hole.

A brake hydraulic pressure control apparatus according to the present invention includes: a base body that has a cylinder hole; a piston that is fitted to the cylinder hole in a freely slidable manner; and a guide ring that is attached to an opening of the cylinder hole and guides sliding of the piston. In the brake hydraulic pressure control apparatus, the guide ring has: a flange portion in a lower surface that opposes the cylinder hole, the flange portion expanding in a radial direction of the guide ring; and bulged portions that are arranged at equally-spaced intervals to an outer circumferential surface of the guide ring and each of which is bulged outward in the radial direction of the guide ring when compared to the flange portion. When seen from a cross section in an axial direction of the guide ring, each of the bulged portions has a tapered portion that expands in the radial direction of the guide ring from the lower surface toward an upper surface of the guide ring.

According to the present invention, it is possible to easily adjust coaxiality between an inner diameter portion of the guide ring and the cylinder hole, and to alleviate a problem of peeling of surface treatment of the guide ring, which is caused when the guide ring is temporarily fixed to the base body.

BRIEF DESCRIPTION OF THE DRAWINGS

FIG. 1 illustrates a view illustrating an exemplary configuration of a brake hydraulic pressure control apparatus according to an embodiment of the present invention.

FIG. 2 illustrates enlarged views of a peripheral portion of a piston and a perspective view of a guide ring in the brake hydraulic pressure control apparatus according to the embodiment of the present invention.

FIG. 3 illustrates a cross-sectional view in a radial direction illustrating a state where the guide ring is attached to a base body in the brake hydraulic pressure control apparatus according to the embodiment of the present invention.

FIG. 4 illustrates axial cross-sectional views each illustrating the state where the guide ring is attached to the base body in the brake hydraulic pressure control apparatus according to the embodiment of the present invention.

DETAILED DESCRIPTION

A description will hereinafter be made a brake hydraulic pressure control apparatus according to the present invention with reference to the drawings.

A description will be made on a case where the brake hydraulic pressure control apparatus according to the present invention is mounted to a four-wheeled vehicle. However, the brake hydraulic pressure control apparatus according to the present invention may be mounted to a vehicle (a two-wheeled vehicle, a truck, a bus, or the like) other than the four-wheeled vehicle. A configuration, operation, and the like, which will be described below, merely constitute one example, and the brake hydraulic pressure control apparatus according to the present invention is not limited to a case with such a configuration, such operation, and the like. In the drawings, the same or similar members or portions will be denoted by the same reference sign or will not be denoted by a reference sign. A detailed structure will appropriately be illustrated in a simplified manner or will not be illustrated.

A description will be made on a configuration and operation of a brake hydraulic pressure control apparatus 1 according to this embodiment.

FIG. 1 is a view illustrating an exemplary configuration of the brake hydraulic pressure control apparatus 1 according to the embodiment of the present invention.

As illustrated in FIG. 1, the brake hydraulic pressure control apparatus 1 includes a rectangular-parallelepiped base body 2 having: a wheel cylinder hole 23 that communicates with a wheel cylinder; a valve hole 24 in which a valve for controlling a brake hydraulic pressure is inserted; a motor hole 21 in which a motor for driving a plunger (not illustrated) is inserted; and a cylinder hole 3 in which a piston 5 of the master cylinder is inserted.

In FIG. 1, the wheel cylinder hole 23 and the motor hole 21 are arranged to a front surface 22 of the base body 2, and the valve hole 24 is arranged to a back surface of the base body 2.

The cylinder hole 3 that accommodates the piston 5 is arranged above side surfaces 4 of the base body 2 and extends from one of the side surfaces 4 to the other side surface 4 in a perpendicular to the side surfaces. In FIG. 1, the cylinder hole 3 is arranged below the wheel cylinder hole 23. However, a vertical position of the cylinder hole 3 can appropriately be changed, and depending on the arrangement of the valve hole 24, the motor hole 21, and the wheel cylinder hole 23, the cylinder hole 3 may be positioned above the wheel cylinder hole 23 or below the motor hole 21.

A guide ring 8 is attached to an opening 9 on the one side surface 4 side of the cylinder hole 3 and guides sliding of the piston 5.

Next, a description will be made on operation of the piston 5.

When a driver operates a brake pedal 7, an operation force is transmitted to the piston 5 via a piston rod 6. When the larger operation force than an urging force of the spring 10 (see FIG. 2), which is arranged in the cylinder hole 3 and urges the piston 5 rightward, is transmitted to the piston 5, the piston 5 moves leftward while being guided by the guide ring 8 and an inner wall of the cylinder hole 3. When the operation force becomes smaller than the urging force of the spring 10, the piston 5 moves rightward by the urging force of the spring 10. In this way, the piston 5 can move in the cylinder hole 3 in a freely slidable manner.

FIG. 2(a) is a cross-sectional view of the piston 5 and the base body 2 around the piston 5.

The piston 5 has a substantially cylindrical shape, and a bottom portion of a bottomed hole 5a that is opened to a right side is connected to a top portion of the piston rod 6. The top portion of the piston rod 6 is formed in a ball shape, and the piston rod 6 can move vertically with the top portion being a fulcrum.

The piston 5 has a bottom hole 5b that has an opening on a left side, and a bottom portion of the bottomed hole 5b is connected to an end of the spring 10.

An annular groove 11 is formed in the inner wall of the cylinder hole 3, and a seal member 12 is inserted in the annular groove 11. The seal member 12 prevents a brake fluid filled in the cylinder hole 3 from leaking out of the base body 2. In the example in FIG. 2(a), the three annular grooves 11 are provided at equally-spaced intervals in an axial direction of the cylinder hole 3, and the seal member 12 is inserted in each of the annular grooves 11.

The opening 9 of the cylinder hole 3 is formed as a step portion that has a larger diameter than an inner diameter of the cylinder hole 3. The opening 9 is provided with the guide ring 8 that is coaxially attached with an axis of the cylinder hole 3 and guides the piston 5.

FIG. 2(b) is a perspective view of the guide ring 8.

The guide ring 8 has a ring shape, and has: a lower surface 8b that opposes the cylinder hole 3 at the time of being assembled to the base body 2; an upper surface 8a that faces an outer side of the base body 2 at the time of being assembled to the base body 2; and a side wall that connects the upper surface 8a and the lower surface 8b.

The guide ring 8 also has a bulged portion 8c in an outer circumferential surface 8d of the side wall. The bulged portion 8c bulges in a radial direction of the guide ring 8. The plural bulged portions 8c are arranged at equally-spaced intervals in a circumferential direction of the guide ring 8, and are integrally formed with the side wall. In FIG. 2(b), each of the bulged portions 8c is formed as a substantially rectangular-parallelepiped raised portion, and a tapered portion 8f (see FIG. 4) is formed on the lower surface 8b side of the guide ring 8. The tapered portion 8f expands in the radial direction of the guide ring 8 from the lower surface 8b toward the upper surface 8a.

The guide ring 8 further has a flange portion 8e on the lower surface 8b, and the flange portion 8e extends in the radial direction of the guide ring 8. Together with the lower surface 8b, the flange portion 8e forms a flat surface of the guide ring 8, and comes into contact with the step portion of the opening 9 at the time of being attached to the base body 2, so as to position the guide ring 8 with the axial direction of the cylinder hole 3.

A terminal end $8f_1$ on an upper surface side of the tapered portion 8f in the bulged portion 8c has a larger diameter than the flange portion 8e (see FIG. 4). This is a necessary configuration for temporarily fixing the guide ring 8 to the opening 9 of the cylinder hole 3 by the bulged portion 8c, and a detailed description thereon will be made below.

FIG. 3 is a view in which a state where the guide ring 8 is attached to the base body 2 is seen from the axial direction of the cylinder hole 3.

In FIG. 3, the bulged portions 8c are arranged to be point-symmetric about a center 14 of the guide ring 8. Similarly, fixed portions 8h, each of which is arranged between the two adjacent bulged portions 8c, are also arranged to be point-symmetric about the center 14 of the guide ring 8. In FIG. 3, four each of the bulged portions 8c and the fixed portions 8h are provided.

Next, a description will be made on a process of fixing the guide ring 8 to the base body 2.

First, the guide ring 8 is press-inserted in the opening 9 of the cylinder hole 3 and is thereby temporarily fixed to the base body 2. The guide ring 8 including the bulged portion 8c is formed to have slightly larger diameter $Rd_{A-A}$ (see FIG. 4) than the diameter of the opening 9. Thus, when the guide ring 8 is inserted in the opening 9, the bulged portion 8c is partially subjected to plastic deformation, and the guide ring 8 is temporarily fixed to the opening 9. At the same time, the cylinder hole 3 and the guide ring 8 are adjusted such that the axes thereof become coaxial. Meanwhile, the guide ring 8 including the flange portion 8e is formed to have a slightly smaller diameter $Rd_{B-B}$ (see FIG. 4) than the diameter of the opening 9. Thus, when the guide ring 8 is inserted in the opening 9, the flange portion 8e does not interfere with an inner wall of the opening 9, and the guide ring 8 can temporarily be fixed to the base body 2.

After the guide ring 8 is temporarily fixed to the base body 2, a part of the base body 2 therearound is subjected to the plastic deformation, and the fixed portion 8h of the guide ring 8 between the two adjacent bulged portions 8c is covered with the part of the base body 2. In this way, the guide ring 8 is caulked to the base body 2.

FIG. 4(a) illustrates a cross section that is taken along A-A in FIG. 3, and FIG. 4(b) illustrates a cross section that is taken along B-B in FIG. 3.

As illustrated in FIG. 4(a), the bulged portion 8c is formed with the tapered portion 8f that expands in the radial direction of the guide ring 8 from the lower surface 8b toward the upper surface 8a of the guide ring 8 when seen from a cross section in an axial direction Ax of the guide ring 8.

In the press-insertion process of the guide ring 8, in which the guide ring 8 is temporarily fixed to the base body 2, the plastic deformation of the bulged portion 8c is initiated from the upper surface-side terminal end portion $8f_1$ of the tapered portion 8f. Accordingly, compared to a case where the bulged portion 8c is not provided with the tapered portion 8f, it is possible to suppress a press-insertion stroke $d_{pf}$. Thus, it is possible to suppress occurrence of contamination that is caused by peeling of surface treatment of the guide ring 8 resulting from the plastic deformation of the bulged portion 8c.

An angle of the tapered portion 8f and an axial position of the upper surface-side terminal end portion $8f_1$ are appropriately adjusted in consideration of required temporary fixing strength of the guide ring 8, ease of adjustment of the coaxiality between the cylinder hole 3 and the guide ring 8, and the like.

FIG. 4(b) illustrates a cross-section of the guide ring 8 including the flange portion 8e.

Similar to the bulged portion 8c, the flange portion 8e is formed with a tapered portion 8g that expands in the radial direction of the guide ring 8 from the lower surface 8b toward the upper surface 8a of the guide ring 8 when seen from the cross section in the axial direction Ax of the guide ring 8. In this way, it is possible to avoid the interference with the opening 9 at the time of inserting the guide ring 8 in the opening 9 and to easily assemble the guide ring 8.

As illustrated in FIG. 4(b), a slight clearance $d_{cr}$ is formed between a part of the flange portion 8e with the largest diameter and the opening 9. Accordingly, the problems such as peeling of the surface treatment in the flange portion 8e at the time of inserting the guide ring 8 in the opening 9 do not occur.

In addition, after the guide ring 8 is temporarily fixed to the opening 9, the fixed portions 8h of the guide ring 8 is fixed by plastically deforming a portion 2a of the base body 2 around the opening 9. In this way, the guide ring 8 is firmly fixed to the base body 2.

As it has been described so far, according to the brake hydraulic pressure control apparatus in the invention of the present application, the following effects can be exerted.

Since the bulged portion 8c is formed with the tapered portion 8f, it is possible to suppress the press-insertion stroke $d_{pf}$ to be small, which in turn can suppress peeling of the surface treatment of the guide ring 8, which is caused by sliding resistance against the opening 9 at the time of inserting the guide ring 8 therein, and the like.

Since the diameter of the flange portion 8e is smaller than the diameter of the opening 9 of the cylinder hole 3, it is possible to prevent the occurrence of the contamination from the flange portion 8e at the time of inserting the guide ring 8.

Since the flange portion 8e is formed with the tapered portion 8g, it is possible to reduce the possibility of the interference with the inner wall of the cylinder hole 3 at the time of inserting the guide ring 8 in the opening 9 and to facilitate the assembly of the guide ring 8.

Since the bulged portion 8c is arranged to be point-symmetric about the center 14 of the guide ring 8, it is possible to stabilize temporary fixing of the guide ring 8 and enhance the coaxiality between the axial direction of the cylinder hole 3 and the axial direction Ax of the guide ring 8.

REFERENCE SIGNS LIST

1: Brake hydraulic pressure control apparatus
2: Base body
3: Cylinder hole
4: Side surface
5: Piston
6: Piston rod
7: Brake pedal
8: Guide ring
8a: Upper surface
8b: Lower surface
8c: Bulged portion
8d: Outer circumferential surface
8e: Flange portion
8f: Tapered portion
8g: Tapered portion
8h: Fixed portion
9: Opening
Spring
11: Annular groove
12: Seal member
21: Motor hole
23: Wheel cylinder hole
24: Valve hole
Ax: Axial direction

The invention claimed is:

1. A brake hydraulic pressure control apparatus (1) comprising:
   a base body (2) that has a cylinder hole (3);
   a piston (5) that is fitted to the cylinder hole (3) in a freely slidable manner; and
   a guide ring (8) that is attached to an opening (9) of the cylinder hole (3) and guides sliding of the piston (5), wherein
   the guide ring (8) has:
      a flange portion (8e) in a lower surface (8b) that opposes the cylinder hole (3), the flange portion (8e) expanding in a radial direction of the guide ring (8); and
      bulged portions (8c) that are arranged at equally-spaced intervals to an outer circumferential surface (8d) of the guide ring (8) and each of which is bulged outward in the radial direction of the guide ring (8) when compared to the flange portion (8e), and
   when seen in an axial cross section of the guide ring (8), each of the bulged portions (8c) has a tapered portion (8f) that expands in the radial direction of the guide ring (8) from the lower surface (8d) toward an upper surface (8a) of the guide ring (8).

2. The brake hydraulic pressure control apparatus (1) according to claim 1, wherein
   a diameter of the flange portion (8e) is smaller than a diameter of the opening (9) of the cylinder hole (3).

3. The brake hydraulic pressure control apparatus (1) according to claim 1, wherein
   when seen from a cross section in an axial direction (Ax) of the guide ring (8), the flange portion (8e) has a tapered portion (8g) that expands in the radial direction of the guide ring (8) from the lower surface (8b) toward the upper surface (8a) of the guide ring (8).

4. The brake hydraulic pressure control apparatus (1) according to claim 1, wherein
   at least a pair of the bulged portions (8c) is arranged to be point-symmetric about a center (14) of the guide ring (8).

5. The brake hydraulic pressure control apparatus (1) according to claim 1, wherein
   the guide ring (8) has a fixed portion (8*h*) between two adjacent bulged portions (8*c*), the fixed portion (8*h*) being used to attach the guide ring (8) to the base body (2) by plastically deforming a part of the base body (2).

6. A manufacturing method for the brake hydraulic pressure control apparatus (1) according to claim 1, the manufacturing method comprising:
   a step of press-inserting and fixing the guide ring (8) into the opening (9) of the cylinder hole (3); and
   a step of fixing the guide ring (8) to the base body (2) by plastically deforming a part of the base body (2) between the two adjacent bulged portions (8*c*).

* * * * *